(No Model.)

C. M. DEWEY.
PUZZLE.

No. 326,725. Patented Sept. 22, 1885.

Witnesses
T. J. Keane
M. H. Chapin

Inventor
Charles M. Dewey
By his Attys.
Gifford & Brown.

UNITED STATES PATENT OFFICE.

CHARLES M. DEWEY, OF JERSEY CITY, NEW JERSEY.

PUZZLE.

SPECIFICATION forming part of Letters Patent No. 326,725, dated September 22, 1885.

Application filed February 27, 1885. (No model.)

*To all whom it may concern:*

Be it known that I, CHARLES M. DEWEY, of Jersey City, in the county of Hudson and State of New Jersey, have invented a certain new and useful Improvement in Puzzles, of which the following is a specification.

I will describe a puzzle embodying my improvement, and then point out the various features in a claim.

Figure 1:
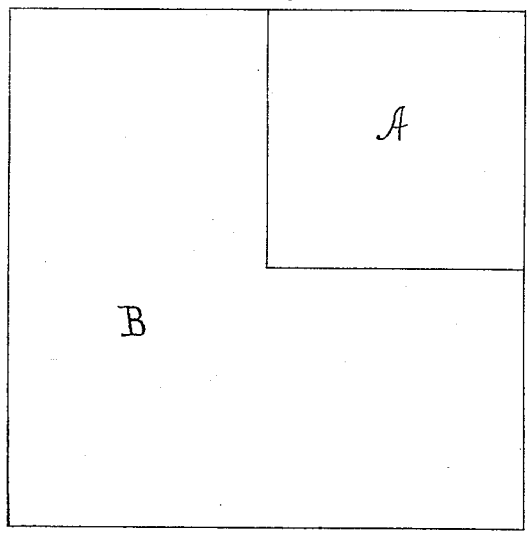
Figure 2:
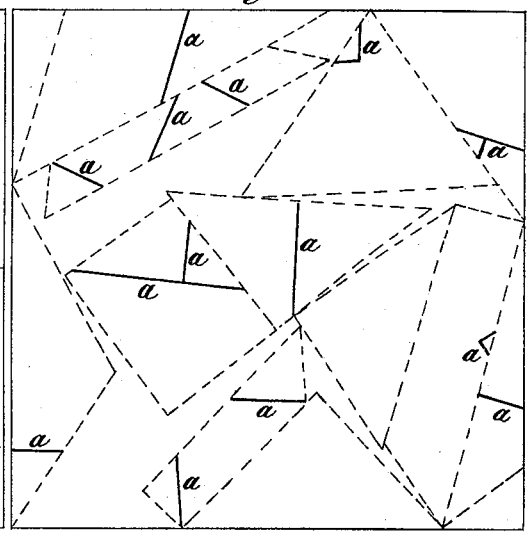
Figure 3:
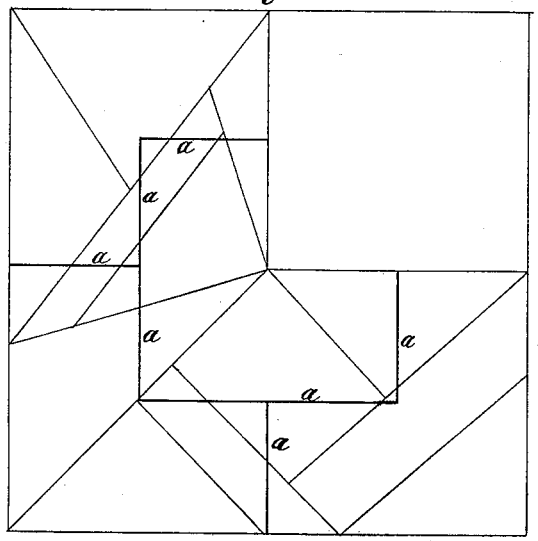

In the accompanying drawings, Figure 1 is a view of a plot of ground, the division of which into certain shaped parts constitutes the puzzle. Fig. 2 is a view of a card adapted to be cut up into pieces to form the puzzle. Fig. 3 shows the pieces of the puzzle arranged so as to solve the puzzle.

Similar letters of reference designate corresponding parts in the several figures.

Referring first to Fig. 1, A designates a representation of a plot of ground which a man left to his widow, and which constituted one-quarter of the entire quantity of land which he left.

B designates a representation of a plot of land which constitutes three-quarters of the land left, and which was left to be divided among his four sons in equal parts and parts of the same shape.

In Fig. 2 I have shown a card, of which portions are marked out by dotted lines. These portions are to be cut out to form the pieces of the puzzle. On these pieces are marked lines *a*, which, when the pieces are properly put together, form the boundaries of the plots which the four sons were to have.

In Fig. 3 I have shown the pieces of the puzzle put together, so as to indicate how the land should be divided to meet the wishes of the testator.

This puzzle is a very simple one and may be made very cheaply. It can be made of paper or card, and will afford much amusement. It consists, essentially, of a square piece of card and a number of small pieces of card, which may be put together to form a large L-shaped portion and marked with lines so that when thus properly put together four small L-shaped diagrams will be delineated upon their surfaces.

What I claim as my invention, and desire to secure by Letters Patent, is—

A puzzle consisting of a square piece and a number of pieces, which may be put together to form a large L-shaped portion, and are so marked with lines that when properly put together four small L-shaped diagrams will be delineated on them, substantially as specified.

C. M. DEWEY.

Witnesses:
T. J. KEANE,
M. H. CHAPIN.